United States Patent [19]

Knauth

[11] 3,902,365
[45] Sept. 2, 1975

[54] MASS FLOW MONITORING SYSTEM AND METHOD

[75] Inventor: Berthold A. Knauth, Daytona Beach, Fla.

[73] Assignee: Rotron Incorporated, Woodstock, N.Y.

[22] Filed: Apr. 24, 1970

[21] Appl. No.: 31,551

[52] U.S. Cl.................. 73/194 M; 73/205 D; 73/32
[51] Int. Cl. ............................................. G01f 1/00
[58] Field of Search........ 73/24, 30, 32, 194 B, 67.2, 73/194 M, 205 D, 231 M; 84/467; 58/23 TF; 324/78 D, 78 Z, 79 D, 186; 235/92 T, 92 TF, 92 F

[56] References Cited
UNITED STATES PATENTS

| | | | |
|---|---|---|---|
| 1,849,271 | 3/1932 | Bower | 58/23 TF |
| 2,803,405 | 8/1957 | Howell | 235/92 TF |
| 3,062,443 | 11/1962 | Palmer | 235/132 |
| 3,333,468 | 8/1967 | Jacobs | 73/194 B |
| 3,420,092 | 1/1969 | Dorsch | 73/32 |
| 3,462,939 | 8/1969 | Tanaka | 58/23 TF |
| 3,491,594 | 1/1970 | Knauth | 73/230 |
| 3,512,352 | 5/1970 | Ito | 58/23 TF |

Primary Examiner—Richard C. Queisser
Assistant Examiner—John P. Beauchamp
Attorney, Agent, or Firm—Roger L. Martin, Esq.

[57] ABSTRACT

A densitometer has an acoustically shielded, temperature insensitive, tuning fork-type density sensing element which incorporates certain design factors and is driven at its natural frequency by a regenerative drive circuit employing piezoelectric drive and pickup crystals. A mass flow rate computing method is embodied in a computing system having electronic multiplication means which operates in dependency upon volume flow rate information in a digital signal and which is controlled by the output from a signal sampling and density computing circuit that operates in dependency upon a digital signal having a frequency that varies as an inverse linear function of the sensed density condition. During a sampling period, the latter circuit gates a clock signal to a counter preset to provide a registered count proportional to the density condition during the sampling period and the registered count is transferred to a memory having an output that controls the output of the electronic multiplication means, between successive count transfers.

7 Claims, 9 Drawing Figures

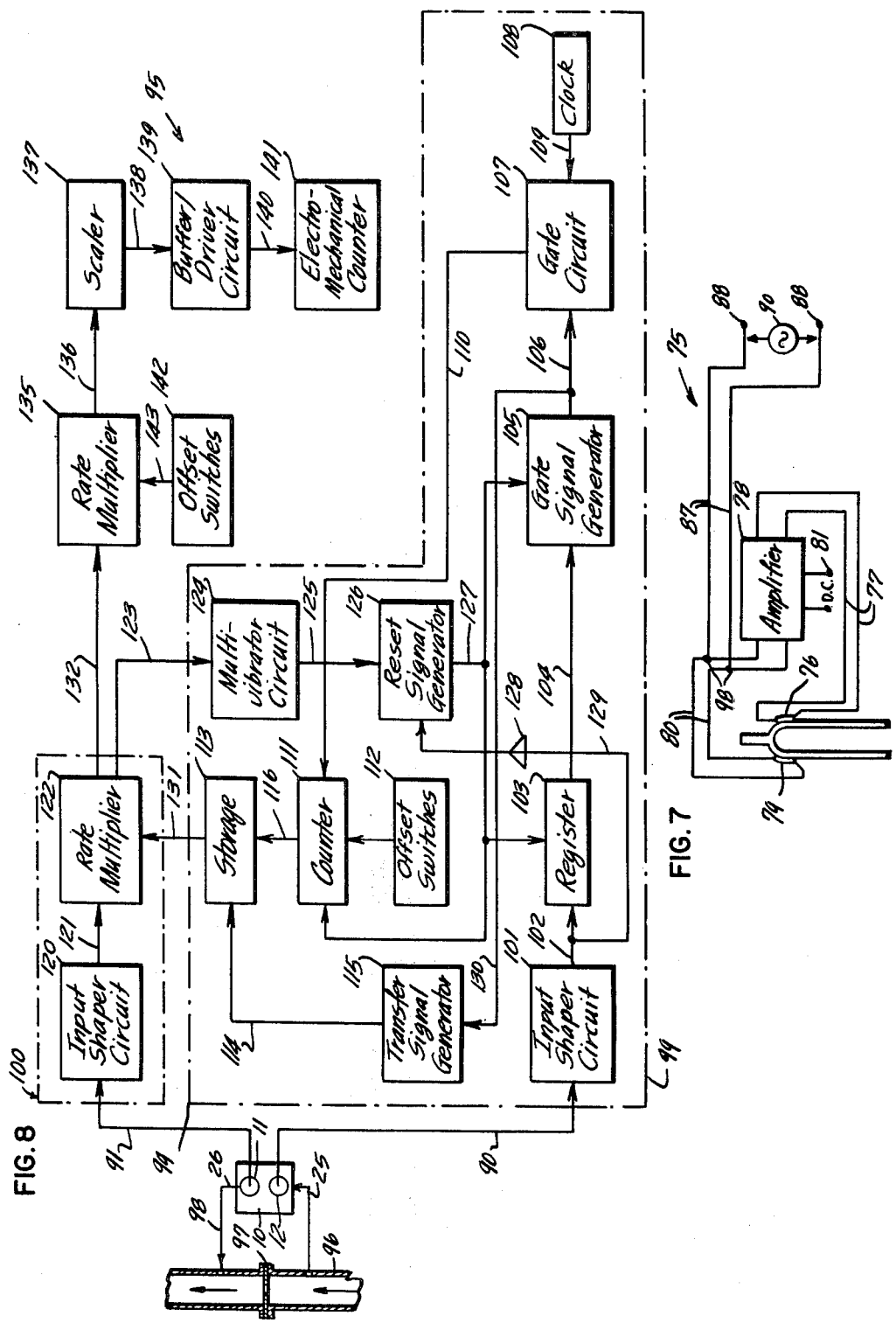

MASS FLOW MONITORING SYSTEM AND METHOD

In the natural gas pipe line transport industry the usual procedure for computing mass flow through a conduit during a measuring period is one that depends on the continuous monitoring and recording of pressure, temperature and volume flow rate conditions during the measuring period. From this information and known constants, the density information is computed before arriving at mass throughput and such proportionally related information, as thermal throughput. Much of the computation is performed manuallly and the need exists in this industry, as well as in other industries, for a reliable system for continuously monitoring and computing the mass flow of fluids through conduits without the need for human intervention during the performance of the computations.

Although accurate and reliable volume flow rate metering devices are available, there is a distinct absence of reliable density monitoring devices that are capable of accurately sensing density conditions over widely varying temperature and pressure conditions and of providing a suitable signal from which density information can be obtained for the continuous electronic computation of mass flow and related information.

It has been proposed to drive a tuning fork-type density sensing element at its natural frequency in the presence of a fluid and to equate the change in frequency caused by the dampening effect of the fluid media on the tine movement to the density of the fluid media. The proponents advocate a magnetic drive and pickup circuit which except for pole piece components embedded in the walls of the sensor housing have components that are located exteriorally of the sensor housing, presumably to avoid locations more proximate to the oscillating member that would otherwise interfere with fluid movement under the influence of the oscillating member. The advocates also contemplate the use of materials which are dimensionally stable to temperature changes in the construction of the sensors so as to avoid frequency changes attributable to changing temperature conditions in the fluid media.

To effectively compute by conventional electronic computation techniques mass flow and related information continuously from signals representing flow rate and density conditions the need arises for each signal to have a measurable component that is linearly related to the monitored condition and one of the problems which has been uncovered in evaluating the advocated approach to density measurements resides in the fact that the relationship between the sensed density condition and the natural frequency of the sensor designs heretofore advocated can only be considered as linearly related over relatively narrow ranges of the density gradient. This, of course, severely limits the useful range of operation of such an instrument. Yet another problem which has been encountered in evaluatng the use of tuning fork-type elements for sensing density conditions is tied into the fact that the dampening effect of the fluid media on the tine movement over substantial changes in the density conditions is such as to impart but minute changes in the natural frequency of the element. This, of course, presents the problem of resolving the minute changes into useful and accurate information indicative of relatively small changes in the density gradient of the media involved.

The invention in accord with certain aspects relates to a densitometer that utilizes a mechanical oscillating member of the tuning fork-type as a density sensing element and in accord with other aspects to a method and system for providing mass flow and related information from electrical signals obtained by continuously monitoring the volume flow rate and density conditions of a fluid flowing through a conduit and where the density representing signal is digital in nature and with a frequency that varies as an inverse function of the sensed density condition.

In accord with one aspect of the invention it has been found that the shape of the tines of the sensing element is an important factor to be considered in providing a linear relationship between the natural frequency of the sensing element and the sensed density condition of the media. Prior art proponents of the use of such sensors have advocated the use of tine attachments of various shapes to increase the sensitivity and reponse of the sensor to the density conditions. It has been found however, that if the tines have opposite sides which, commencing at the distal end, are uniformly spaced apart and located in parallel planes perpendicular to the plane of oscillation for at least a major part of the distance from the distal end to the root end of the tine, that the natural frequency of the sensor bears a close inverse linear relationship to the sensed density over broad ranges of density variance.

Yet another aspect of the invention has to do with the circuit for driving the sensor at its natural frequency and for sensing the vibrational movement. In accord with this aspect of the invention a drive and pickup circuit is provided which uses piezoelectric crystals as the drive and pickup elements in the circuit arrangement. This has certain advantages in that the drive and pickup crystals can be attached to the tines in areas where the oscillating tines exert relatively little influence on the fluid media so that their presence in the fluid media exerts practically no influence on the natural vibrational characteristics of the sensor.

Various different types of tuning forks which have vibrational characteristics that are insensitive to temperature changes over relatively broad temperature ranges are known and the drive and pickup arrangement advocated herein may be used with equal facility with such tuning forks. For example, in the time piece industry it is known to manufacture so-called temperature insensitive or temperature stable tuning forks from materials that have different coefficients of expansion and to laminate such materials together in the fork structure so as to provide an overall coefficient of expansion which is substantially zero. Apart from this method one can also construct a tuning fork from metal alloys or nonmetallic materials that have modulus of elasticity and temperature coefficients which are substantially uninfluenced by temperature changes. One of the disadvantages to using the metals or metal alloys however is the fact that in many instances they are subject to corrosion under the conditions involved in the fluid media. Because of this, it is preferable to manufacture the sensor out of a nonmetallic, temperature insensitive, and corrosion resistant material, such as fused quartz which is highly resistant to corrosion and deterioration in most environments encountered by fluid sensors. The use of a quartz material however, necessitates the embedding of a ferromagnetic element in each tine during the manufacturing process if a magnetic pickup and drive arrangement is to be used and the element is to be shielded from corrosive environments. The use of a piezoelectric crystal drive and pickup arrangement avoids the need for such elements and thus the need for complicated procedures for manufacturing such temperature insensitive sensors.

Yet another aspect of the invention has to do with the suppression or elimination of standing acoustical waves in the nature of echos from rigid structures in the environment surrounding the oscillating element. Such acoustical waves tend to disrupt the natural frequency at which the tines are driven and may be eliminated by lining the rigid housing and other rigid wave reflecting structure in the proximity of the sensor with appropriate acoustical material. In accord with this aspect of the invention however, a chamber defined by fluid pervious material is provided in the rigid housing for the sensor. The fluid pervious material not only serves as a wave dampening acoustical shield for the sensor but also serves as a filter preventing solid particles entrained in the fluid media from otherwise coming into contact with the mechanical oscillator. Although other materials may be used to provide the filter forming acoustical shield, a simple screen made from corrosion resistant wire, such as stainless steel, or from inert plastic filaments, such as teflon filaments and having a suitable mesh size that will preclude entrance of foreign particles into the chamber is preferred.

Yet another aspect of the invention has to do with a method and system for electronically computing mass flow and related information from signals obtained through the continuous monitoring of flow rate and density conditions of a flowing fluid in a conduit and wherein the signal representing the density condition has a frequency which varies an an inverse linear function of the monitored density condition. In accord with this aspect of the invention, a continuous signal representing mass flow rate conditions in a conduit is provided by electronic multiplication means which operates in dependency on the continuous receipt of a signal indicative of the volume flow rate condition and the output from a signal sampling and density condition computing circuit which intermittently samples the digital signal indicative of the density condition and continuously provides an electrical output representing the density condition during the preceding sampling period for controlling the electronic multiplication means.

With respect to this aspect of the invention, it can be shown that the density condition at a given frequency of a digital signal having a frequency that varies as an inverse linear function of the density condition bears a relationship to the frequency which can be represented by the following equation:

$$d_o = K \left( \frac{1}{f_o} - \frac{1}{f_r} \right) \quad (1)$$

where
$d_o$ = the density condition lbs/cuft at frequency $(f_o)$,
$f_o$ = the frequency (cycles/sec) representing the density condition $(d_o)$,
$f_r$ = the frequency (cycles/sec) representing a density condition under vacuum conditions, and
$K$ = a constant (lbs/cuft/sec/cycle)

Since the period of time (sec) for one cycle is the reciprocal of frequency, equation (1) can be rewritten as follows:

$$d_o = K (p_o - p_r) \quad (2)$$

where
$p_o$ = the period of time (sec) for one cycle of a signal having a frequency $(f_o)$
$p_r$ = the period of time (sec) for one cycle of a signal having a frequency $(f_r)$ In accord with this aspect of the invention, provisions are made to intermittently sample the digital signal indicative of the density condition for sampling periods that vary in accord with the frequency conditions of the signal but which correspond in time to the time period for a predetermined number of cycles in the sample. During the sampling period, a clock signal is gated to a counter which operates in a totalizing mode from a preset condition that registers a count at the end of the sampling period which is directly proportional to the average density condition during the sampling period. This count is transferred to a memory or storage having an electrical output for controlling the electronic computing means during the time interval between successive transfes of the count.

The relationship between the memorizable count and the average density condition during a sampling period which spans the period for $(n)$ cycles in the digital signal can be developed from equation (2) to provide the following equation:

$$D = K/n (n P_o - n p_r) \quad (3)$$

where
$D$ = the average density (lbs/cuft) during the sampling period.
$n$ = the number of cycles in the signal sample.
$P_o$ = the average period of time (sec) for one cycle in the signal sample. If a clock signal having a constant frequency $(f_c)$ is gated to a counter operating in a totalizing mode during sampling periods that are respectively equal to $nP_o$ and $np_r$, then the respective counts can be represented as follows:

$$C_o = f_c n P_o \quad (4)$$

and $$C_r = f_c n p_r \quad (5)$$

where
$f_c$ = the frequency (cycles/sec) of the clock signal,
$C_o$ = the count during a sampling period having a time duration equal to $nP_o$, and
$C_r$ = the count during a sampling period having a time duration equal to $np_r$. By substituting from equations (4) and (5), equation (3) can be rewritten as follows:

$$D = \frac{K}{nf_c}(C_o - C_r) \quad (6)$$

Since $K$, $n$, and $f_c$ are constants, it is evident that the average density during the sampling period is directly proportional to the difference count $(C_o - C_r)$. As such, by programming the counter, by the compliment method known to those skilled in the art, so that it resets at the commencement of each sampling period at a count causing it to overflow during the sampling period after receiving a number of pulses in the clock signal which corresponds to $(C_r)$, that the totalized pulse count $(C_o)$ received by the counter during the sampling period will be registered at the end of the sampling period as the difference count ($C_o - C_r$). This registered count can then be memorized and used for controlling the electronic multiplication means during the interval between successive sample computations.

The signal representing the flow rate condition in accord with this aspect of the invention can be obtained through the use of any suitable volume flow rate metering device having an output signal with a measurable component bearing a direct linear relationship to the flow rate condition, and the electronic multiplication means may effectuate the multiplication by either digital or analog techniques. In the preferred form multiplication is accomplished by digital techniques involving the use of rate information provided in the form of a digital signal from the rate metering device. The invention in this respect, however, also contemplates use of rate information supplied from a rate metering device in the form of an analog voltage which can be converted to a digital signal by means well known in the art.

In the preferred form, the output from the density sampling and computing circuit is supplied as a control signal to the logic circuitry of a programable rate multiplier in a binary coded decimal (BCD) format. It will readily occur to those skilled in the art however, that the control signal can be supplied in other forms and can also be used in controlling electronic multiplication means operating in accord with analog principles.

A general object of the invention is to provide improvements in the art of metering fluid. One particular object is to provide more reliable densitometers of the mechanical oscillator type and which are more accurately responsive to density conditions. Yet another object is to provide improved sensors and drive arrangements for densitometers of the mechanical oscillator type having a temperature insensitive or temperature stable density sensing element. Yet another object is to provide improved wave dampening means for acoustically shielding the sensing element of a mechanical oscillator type densitometer from standing waves that would otherwise interfere with the natural frequency of oscillation of the sensing element. Still another objective of the invention is to provide improved methods and systems for computing mass flow and related information from signals that respectively indicate monitored flow rate and density conditions and wherein the signal indicative of the density condition has a frequency that varies as an inverse substantially linear function of the sensed density condition. Yet a further object of the invention is to provide an improved method and system for translating density information in a signal having a frequency which varies an an inverse linear function of the density condition into a signal useful for electronically multiplying the density condition with flow rate information contained in another signal.

The novel features which are believed to be characteristic of this invention are set forth with particularity in the appended claims. The invention, itself, however, both as to its organization and method of operation, together with further objects and advantages thereof, may best be understood by reference to the following description taken in connections with the accompanying drawings, in which:

Figure 1:
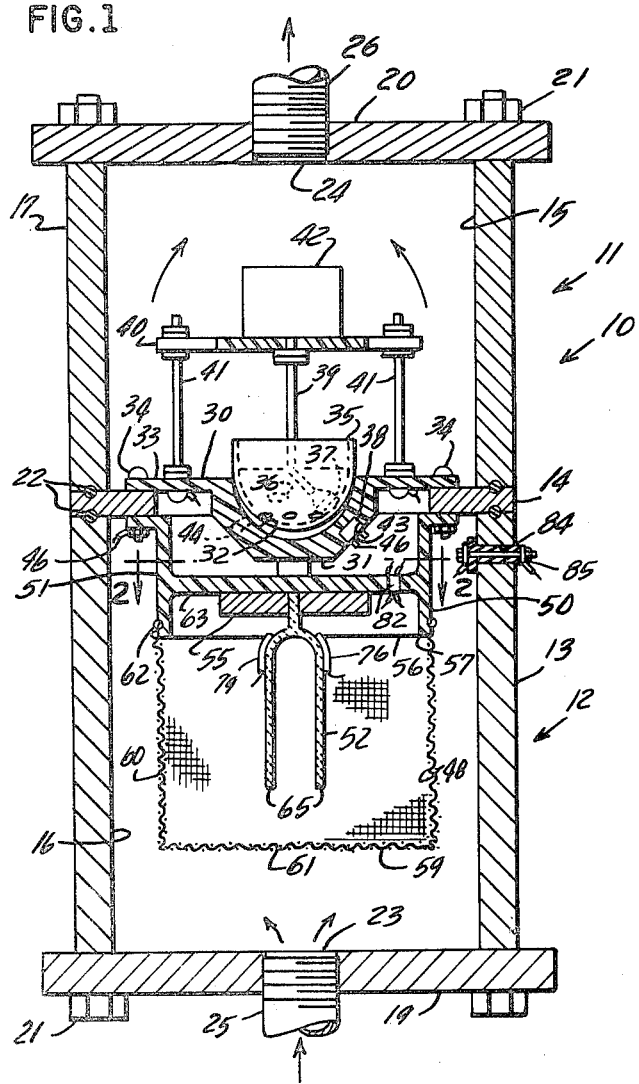
FIG. 1 is a vertical section view along the axis of an instrument embodying components for simultaneously monitoring the fluid flow rate and density conditions in a conduit and which includes components of a densitometer embodying certain aspects of the invention.
Figure 4:
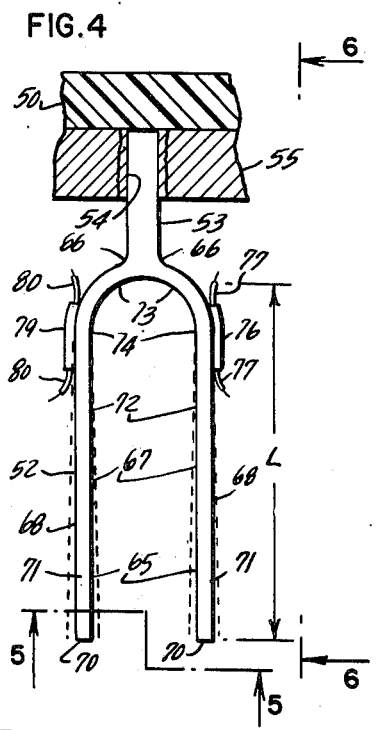
FIG. 4 is a side elevational view of the tuning fork-type density sensing element of the densitometer seen in FIG. 1 with adjacent structure and parts broken away.
Figure 6:
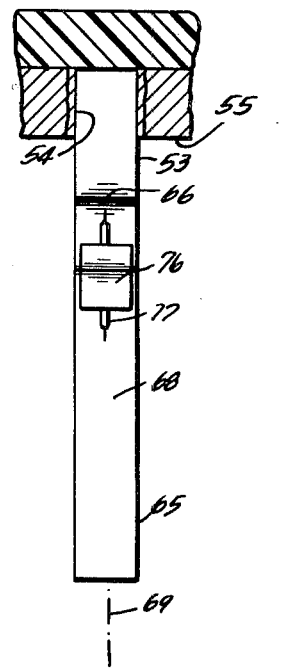
FIG. 6 is an elevational view at the side of one of the tines together with adjacent structure as generally seen along the lines 6—6 of FIG. 4.
Figure 5:
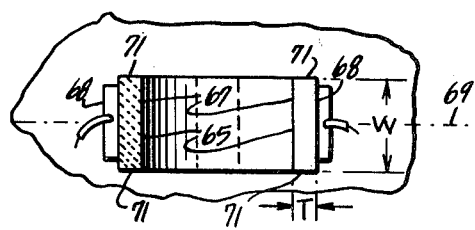
FIG. 5 is a bottom view of the sensor as seen along the lines 5—5 of FIG. 4.

FIG. 7 is a schematic diagram of the drive and pickup circuit for the density sensing element seen in FIGS. 4 through 6; and FIG. 8 schematically illustrates a hookup in a natural gas pipe line for the instrument seen in FIG. 1 together with a system illustrated schematically for continuously computing mass flow information from the signals derived from the flow meter and densitometer embodied in the instrument.

Reference is first made to FIG. 1 and wherein an instrument embodying certain aspects of the invention is designated at 10. It includes a volume flow rate meter 11 for measuring flow rate conditions of a fluid and a densitometer 12 for measuring the density conditions of the fluid. The instrument shown has a two piece housing 13 for the principal components of the flow meter and densitometer and these components are mounted on a flat annular mounting plate 14 which generally divides the interior of the housing into separate chambers 15 and 16 for the flow rate and density sensing components of the flow meter and densitometer respectively.

The housing 13 includes a pair of cylindrical shells 17 and 18 which are coaxially arranged in the assembled housing and respectively welded to rectangular end plates 19 and 20 at the inlet and outlet ends of the apparatus. The shells 17 and 18 are secured together in the assembled housing 13 by bolt-type fasteners 21 which engage the end plates 19 and 20 at the exterior of the housing. As seen in FIG. 1, the annular mounting plate 14 is interposed and clamped between the shells 18 and 17 in the assembled housing and the instrument is provided with a pair of O-rings 22 that provide a hermetically sealed housing for the sensors. Rectangular plates 19 and 20 have inlet and outlet openings 23 and 24 for receiving inlet and outlet pipes 25 and 26 respectively.

The flow meter 11 and its operation are fully described in U.S. Pat. NO. 3,491,594, issued to the applicant on Jan. 27, 1970. Briefly, it includes an orifice plate 30 that has a center section 31 with a downstream surface that defines an upwardly opening cavity 32. The plate 30 has a radially extending annular flange section 33 which is integral with the center section 31 and fastened to the mounting plate 14 by fasteners, designated at 34. The flow rate sensing element, or rotor 35, is a hollow, generally hemispherical member which is fluid supported during operation of the meter without the aid of mechanical bearings and is stabilized against tilting with respect to the cavity axis and against oscillatory movement in the cavity by means shown and described in the aforementioned patent.

The rotor 35 carries an electrically conductive segment 36 which during rotation of the sensor interrupts the field between a pair of coils designated at 37 and 38. Coil 37 is located in the hollow of the rotor 35 and is suspended from a probe 39 which in turn is mountd on a triangular plate 40. Plate 40 is supported spacedly above the rotor on suitable fasteners 41 which interconnect the plate and flange section 33 of plate 30. Plate 40 supports a cylindrical housing 42 for certain components of the output circuit used in translating the rotational movement of the sensor 35 into a digital output signal and these components are encased in suitable plastic materiall in the housing. Section 31 has a recess 43 at the upstream side of plate 30 and in which coil 38 is located. Section 31 is also provided with a plurality of openings or orifices 44 which communicate between the opposite sides of the plate and deliver the fluid tangentially into the cavity 32. In instrument 10 orifices 44 provide the sole means by which fluid passes from chamber 16 to chamber 15.

Figure 2:
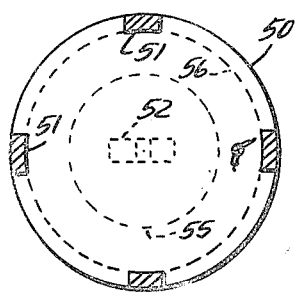
FIG. 2 is a horizontal section along the lines 2—2 of FIG. 1.
Figure 1A:
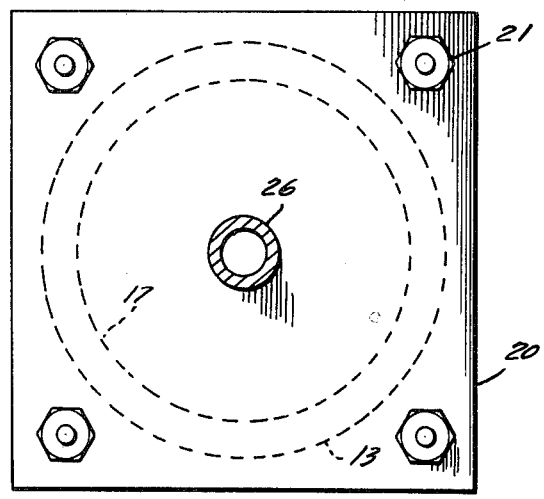
FIG. 1a is a top plan view of the instrument seen in FIG. 1.

Densitometer 12 includes a support for the tuning fork-type density sensing element 52 and which is shown in the form of a downwardly opening plastic cup-shaped member 50 that is suspended from the mounting plate 14 by four circumferentially spaced and integrally connected L-shaped brackets 51 that are fastened to the underside of plate 14 by the orifice plate attaching fasteners 34. The density sensing member of the densitometer is shown in the form of a tuning fork-type element 52 which has a base end 53 that is rectangular in cross section and received in a rectangular opening 54 in a circular metal plate 55. The base end 53 of the fork is rigidly secured to the metal plate 55 by means of a suitable adhesive. Plate 55 is in turn rigidly glued by a suitable adhesive to the circular base section 63 of the cup-shaped member 50 and in a coaxial arrangement with respect to and between the depending cylindrical wall section 56 of the cup-shaped member 50, as best seen in FIGS. 1 and 2.

Figure 3:
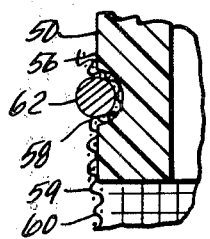
FIG. 3 is an enlargement of a fragment seen in FIG. 1.

At its perimeter and adjacent its lower end 57, cylindrical wall section 56 has a groove 58 in which a split ring retaining element 62 is received, as best seen in FIG. 3. Element 62 engages the upper end of a cylindrical section 60 of a fluid pervious screen 59 that has a circular lower end section 61. Ring 62 provides a means for clamping the screen component 59 to the sensor support 50.

The fluid pervious screen 59 defines a chamber 48 in which the sensor is located within the densitometer chamber 16 and serves as a wave dampening acoustical shield that prevents the establishment of standing acoustical waves between the densitometer shell 18 and the sensor 52. The screen 59 also serves as a filter that permits the fluid which enters chamber 16 through the inlet 23 to pass by diffusion into and out of the chamber 48 while nevertheless preventing entrained solid particles from coming into contact with the sensing element 52.

The density sensing element 52 in the embodiment illustrated is in the form of a tuning fork having the shape best seen in FIGS. 4 through 6 inclusive. The fork 52 has a pair of tines 65 which are symmetrically oriented and spaced apart in the plane 69 of oscillation of the sensor and which are integrally connected at their root ends 66 to the rigid base component 53 of the fork 52. In the preferred embodiment shown, each tine has a simple rectangular cross sectional configuration that is uniform substantially throughout the length of the tine and also has a width dimension that substantially exceeds the thickness dimension of the tine so as to minimize viscosity effects on the frequency characteristics of the sensor. This arrangement provides each tine with parallel opposite sides 67 and 68 which are located substantially throughout the entire distance from the distal end 70 to the proximal or root ends 66 of the tine in parallel planes that are normal to the plane 69 of oscillation. The opposite edges 71 of the tines in the arrangement are located in spaced planes which are parallel to the plane 69 of oscillation.

When the tines are oscillating, the fluid media in the proximity of the root ends 66 has less influence on the vibrational characteristic of the sensor than does the fluid in the proximity of the distal end 70. Because of this, the tine shape at the root ends 66 is less influencing on the vibrational characteristics of the sensor than is the shape at the distal end 70. In general however, the opposite sides 67 and 68 of each tines throughout the major part of the distance from the distal to the root end of each tine should fall in parallel planes that are normal to the plane of oscillation. In the preferred structure the opposite sides fall in such parallel planes substantially throughout their entire length and under such circumstances, it has been found that the natural frequency of vibration of the sensor bears a close inverse linear relationship to the sensed density condition of both liquids and gases, with experience showing less than ½ percent deviation from actual density conditions over pressure ranging from near vacuum conditions to as high as 500 psi with temperature insensitive sensors having the preferred shape advocated herein.

The sensor 52 is stable to temperature changes in the sense that its vibrational characteristics are uninfluenced by temperature changes in the fluid media over the operating ranges contemplated for the densitometer, and in the illustration, the fork 52 is made of fused quartz since the modulus of elasticity of this material remains essentially constant with temperature variations and the temperature coefficient of expansion is nearly zero for most practical purposes.

The fork is driven at its natural frequency of vibration under the environmental conditions existing in chamber 16 by means of a regenerative feedback drive and pickup circuit 75 which is best shown in FIG. 7. Each tine in the illustration has a straight section 72 and also has a bent or arcuate section 73 which is located at the proximal end 66 of the tine and merges with section 72 as at 74. Circuit 75 has a pair of piezoelectric crystals that are mounted on the outside 68 of the tines 65 so that they overlap the juncture 74 between the sections 72 and 73. The crystals are coated with suitable plastic material to prevent corrosive attack from the surrounding media and are secured to the tines by means of suitable adhesive material that firmly fixes the crystals to the tines. The pickup crystal 76 of circuit 75 is connected by leads 77 to the input side of an amplifier 78 and the drive crystal 79 is connected to the output side of the amplifier 78 by leads 80. Amplifier 78 is connected to a suitable DC source 81, and as the pickup crystal 76 is deformed by movement of the tine to which it is attached, it generates a voltage across leads 77 which is amplified in amplifier 78 and fed by leads 80 to the drive crystal 79. This, of course, causes crystal 79 to bend and drive the fork at its resonant frequency.

The circular base section 63 of the cup-shaped support member 50 has a small opening 83 through which leads 77 and 80 pass to the exterior of the chamber formed by the cup-shaped member 50 and screen 59. Opening 82 is filled with a suitable plastic material that encases leads 77 and 80 and these leads 77 and 80 together with the output leads 46 from flow meter 11 pass to the exterior of housing 13 through suitable terminals 85 which are circumferentially spaced apart and mounted in appropriate hermetically sealed openings 84 in shell 18. The output from the amplifier is tapped at termnals 86 by leads 87 and the output signal 90 appears across terminals 88 as an alternating voltage signal which is inversely and linearly related in frequency to the density of the fluid media sensed by the sensor 52.

In the normal operation of the instrument 10 the fluid being monitored is continuously fed via pipe 25 through opening 23 into the density chamber 16. Here the fluid passes into and out of chamber 48 through screen 59 and the density condition is sensed by sensor 52 and translated by circuit 75 into an AC voltage signal 90 having a frequency which is inversely and linearly related to the sensed density condition. From chamber 16, the fluid admitted to the instrument passes to the orifices 44 that tangentially delivers it into the cavity area of chamber 15. This drives and causes rotational movement of the rate sensor or rotor 35. The rotor 35 of the flow meter illustrated is adapted to rise from its seat on the rim of the cavity and to be solely supported by fluid when it is rotatably driven by the fluid admitted to the chamber 15. This enables the fluid in the cavity to pass out of the cavity and proceed, during the normal operation of the instrument, as indicated by the arrows to the outlet opening 24 where it is delivered to the exterior of the meter through conduit 26. The output signal from the flow meter appears acros output leads 46 as a pulsating signal having a frequency which is proportional to the flow rate of fluid through the instrument.

Reference is now made to FIG. 8 and wherein a system 95 for carrying out the process aspects of the invention is shown under circumstances where the volume flow rate and density conditions of a gas flowing through a conduit 96 are monitored by means of the flow metter 11 and densitometer 12 components of instrument 10.

Conduit 96 in the illustration is equipped with an orifice plate 97 to establish a differential pressure enabling the instrument 10 to be connected in a fluid circuit 98 through which a portion of the fluid flowing in conduit 96 is shunted for reasons of the differential pressure established by the orifice plate 97. In this shunt circuit 98, the inlet side of the instrument is connected by conduit 25 to the upstream or high pressure side of the orifice plate and the outlet side of the instrument is connected by conduit 26 to the low pressure or downstream side of the orifice plate in accord with practices that are well known in the art.

The computer system 95 illustrated in FIG. 8 includes a signal sampling and density condition computing circuit 99 and an electronic multiplication circuit designated at 100. The multiplication circuit 100 operates in dependency on the continuous receipt of the flow meter signal 91 and is controlled by the output signal 131 from circuit 99. As previously indicated, the output signal 90 from densitometer 12 has a frequency which varies as an inverse, substantially linear function of the monitored density condition and circuit 99 operates in dependency upon the continuous receipt of this signal 90.

Signal 90 from densitometer 12 is a sinusoidal type digital signal and is fed to an input shaper circuit 101 of circuit 99. Circuit 101 provides a train of square wave pulses of suitable polarity and of the same frequency as signal 90, and the digital signal 102 is continuously delivered to a register 103. Register 103 in the illustration is composed of three decade counting units connected in series. Register 103 is wired to provide during the interval between successive resets an output 104 to a gate signal generator 105 upon the receipt of each 1,000 pulses in signal 102 and is wired to reset to a count of 999 in response to a command signal 127 from a reset generator circuit 126.

Gate signal generating circuit 105 has a reset capability and is responsive during the interval between successive reset signals 127 from circuit 126 to the first pair of pulses received from register 103 to provide time spaced start and stop pulse signals 106 to a gate circuit 107. Circuit components 101, 103 and 105 provide a gate control means responsive to signal 90 for opening the gate circuit 107 for a sampling period having a time duration corresponding to that determined by the frequency of signal 90 and the number of cycles in the signal sample determined by the register.

Citcuit 99 includes a clock 108 which generates a square wave pulse train having a suitable polarity and a constant frequency greater than those frequencies encountered in signal 90, such as 1 Mhz. This signal 109 is continuously delivered to the gate circuit 107 so that when the gate opens, the clock signal 109 is delivered, as indicated at 110, to an electronic counter 111 during the gating period. Counter 111 takes the form in the illustration of a register composed of a plurality of decade counting units which are connected in series and wired to provide an electrical output 116 in binary coded decimal format to a storage 113 which upon receipt of a command signal 114 from a monostable transfer signal generator circuit 115 instantaneously stores the count registered in counter 111 in a binary coded decimal format.

The decade counting units of counter 111 are provided with offset switches 112 for manually presetting the counter by the compliment method heretofore referred to so that the count registered at the time of transfer is the difference between the count during the gate time and the count that would be received during the gating interval if signal 90 had a frequency representing a vacuum density condition.

The output signal 91 from flow meter 11 has a frequency which is directly proportional to the rate of flow through conduit 96 and is fed to an input shaper circuit component 120 of circuit 100. The shaper circuit 120 provides a square wave pulse train having a suitable polarity and a frequency corresponding to that of signal 91. This signal 121 is continuously delivered to a programable rate multiplier 122 that includes a suitable electronic counter such as a register composed of a plurality of decade counting units connected in series and which are wired to suitable gating logic controlled by the output signal 131 from storage unit 113. The counter of multiplier 122, under such circumstances, is wired to deliver a pulsed signal 123 to a monostable multivibrator circuit 124 of circuit 99 each time the multiplier register overflows. In response to the overflow pulse signal 123, circuit 124 delivers a signal 125 that triggers a bistable reset signal generator circuit 126 to deliver a reset command signal 127 to the gate signal generator circuit 105 and to each of the registers 103 and 111. The "not" state of the bistable 126 under such circumstances is re-established after each output signal 127 by tapping the output signal 102 of circuit 101 and delivering it via an inverter 128 to the bistable 126 as by lead 129.

The monostable circuit 115 of the density signal sampling and computing circuit 99 is wired to the output of the gate signal generator 105 and is responsive to the stop signal 130 to deliver the transfer pulse 114 to memory 113 so that when the gate 107 closes, the registered count is memorized in memory 113 and impressed as an electrical output signal 131 in binary coded decimal format on the gating logic of multiplier 122.

In the operation of sysem 95 the sampling period is determined by the frequency characteristics of signal 90 as the signal is being sampled and the cycle response of register 103. Counter 111 is manually preset by the offset switches to overflow during the sampling period at a predetermined count corresponding to that registerable by counter 111 when the frequency of signal 90 corresponds to that representing vacuum density condition. Because of this, counter 111 registers a difference count which is directly proportional to the monitored density conditions during the sampling period at the time the count 116 is transferred to memory 113. Accordingly, the output signal 131 of memory 113 between successive transfers controls the multiplier 122 in accord with and represents the average density condition in the conduit during the preceding sampling period so that the output signal 132 of multiplier 122 is representative of the mass flow rate conditions as computed on the basis of the instantaneous volume flow rate conditions represented by signal 91 and the density conditions during the preceding sampling period. The output signal 132 of multiplier 122 in the embodiment illustrated takes the form of a digital pulse train that has a frequency during the intervals between the successive transfers of the count represented by signal 116 to memory 113 that is directly proportional to the mass flow rate as determined by the volume flow rate information continuously fed to the circuit 110 and the density condition represented by the electrical output 131 of circuit 99 for the preceding sampling period.

In the embodiment of the invention illustrated signal 132 is delivered to another programable rate multiplier 135 which is provided with suitable offset switches 142 for impressing on the gating logic a suitable output 143, determined by the circuit and meter constants, to provide an output signal 136 from the multiplier 135 which has a frequency proportional to the mass flow rate information in signal 132 and also related to the desired units of mass flow or related information being measured. In this instance the signal 136 is delivered to a scaler 137 of a readouot circuit having a buffer driver circuit 139 that operates in dependency on the scaled output 138 of scaler 137 and an electromechanical counter 141 which is driven in its totalizing mode to display the mass flow or allied information in the desired units by the output 140 of the driver circuit 139.

While only certain preferred embodiments of this invention have been shown and described by way of illustration, many modifications will occur to those skilled in the art and it is, therefore, desired that it be understood that it is intended herein to cover all such modifications as fall within the true spirit and scope of this invention.

What is claimed as new and what it is desired to secure by letters patent of the United States is:

1. The method of continuously computing mass flow rate related information from continuous signals that include a signal representing the monitored volume flow rate condition of a fluid flowing through a conduit and a digital signal having a frequency that varies as an inverse substantially linear function of the monitored density condition of the flowing fluid comprising: intermittently sampling the digital signal for a sampling period having a time duration corresponding to the time period for a predetermined number of cycles in the signal sample, counting the pulses in a high frequency clock signal during each sampling period in counting means registering, at the end of the sampling period, the difference between the pulse count for the sampling period and a predetermined count corresponding to the number of pulses in the clock signal during a period having a time duration corresponding to that for said predetermined number of cycles in a sample of the digital signal having a frequency representing a vacuum density condition, successively transferring the registered difference counts to memory means having an output control signal which, during the interval between successive transfers, represents the average fluid density condition during the sampling period associated with the registered difference count last memorized therein, continuously delivering the signal representing the fluid flow rate condition to electronic multiplication means, and continuously controlling the electronic multiplication means in response to the output control signal to provide a signal which, during the interval between successive transfers, represents the product of the average fluid density condition represented by the output control signal during the interval and the fluid flow rate condition represented by the fluid flow rate condition signal delivered during the interval to the electronic multiplication means.

2. The method of continuously computing mass flow rate related information from continuous signals that include a first digital signal having a frequency substantially proportional to the monitored volume flow rate condition of a fluid flowing through a conduit and a second digital signal having a frequency that varies as an inverse substantially linear function of the monitored density condition of the flowing fluid comprising: intermittently sampling the second digital signal for a sampling period having a time duration corresponding to the time period for a predetermined number of cycles in the signal sample, counting the pulses in a high frequency clock signal during each sampling period in counting means having an electrical output at the termination of the count which represents the difference between the pulse count for the sampling period and a predetermined count corresponding to the number of pulses in the clock signal during a period having a time duration corresponding to that for said predetermined number of cycles in a sample of the second signal having a frequency representing a vacuum density condition, successively transferring the difference counts to memory means having an electrical output control signal which, during the interval between successive transfers, represents the average density condition during the sampling period associated with the difference count last memorized therein, continuously delivering the first digital signal to electronic multiplication means, continuously controlling the electronic multiplication means in response to the output control signal to provide a digital signal which, during the interval between successive transfers, has a frequency proportional to the product of the average fluid density condition represented by the electric output control signal during the interval and the fluid flow rate condition represented by the delivered first digital signal during the interval.

3. A system for monitoring the mass flow rate of a fluid flowing through a conduit comprising a volume flow rate meter for monitoring the volume flow rate condition in the conduit and having an output signal continuously representing said flow rate condition, a densitometer for monitoring the fluid density condition in the conduit and having a continuous digital output signal with a frequency that varies as an inverse substantially linear function of monitored density condition, a circuit operating in dependency upon the continuous receipt of and for intermittently sampling said digital output signal including a clock having a high frequency pulse signal, an electronic counter for counting pulses in the clock signal, gate means for passing the clock signal to said counter, gate control means responsive to the digital output signal for opening the gate means for a sampling period having a time duration corresponding to the time period for a predetermined number of cycles in the signal sample, and storage means for memorizing the registered count at the end of the sampling period; said counter being preset to register a count at the termination of the sampling period which represents the difference between the count for the sampling period and a predetermined count corresponding to the number of pulses in the clock signal during a period having a time duration corresponding to that for said predetermined number of cycles in a sample of the digital output signal having a frequency representing a vacuum density condition and having an electrical output representing the average fluid density condition during the sampling period associated with the registered count, said storage means being responsive to the count registered therein and having an electrical output signal representing the average fluid density cndition during the sampling period associated with the registered count last memorized therein, and electronic multiplication means operating in dependency upon the continuous receipt of the rate meter output signal and controlled by the electrical output of the storage means to continuously provide a signal representing the product of the flow rate condition represented by the received rate meter output signal and the average density condition represented by the electrical output signal of said storage means.

4. A system in accord with claim 3 where said densitometer includes a density sensing member in the form of a temperature stable tuning fork type element, and drive circuit means for driving the fork element at its natural frequency of vibration and providing said digital output signal, said element having a pair of tines that are spaced apart in their plane of oscillation and rigidly interconnected at their root ends, and each of said tines having opposite sides which, commencing at the distal end of the tine, are uniformly spaced apart and arranged in parallel planes perpendicular to the plane of oscillation for at least a major part of the distance from the distal end to the root end of the tine.

5. A system in accord with claim 4 where each tine has an arcuate section and a straight section that is joined integrally therewith, and where said drive circuit means has a pair of piezoelectric crystals that are respectively secured to the outside of said tines in positions overlapping the juncture between the arcuate and straight sections.

6. A system for monitoring the mass flow rate of a fluid flowing through a conduit comprising a volume flow rate meter for monitoring the volume flow rate of the fluid in the conduit and having a continuous output signal representing the fluid volume flow rate condition therein, a densitometmer for monitoring the density of the fluid in the conduit and having a continuous digital output signal with a frequency that varies as an inverse substantially linear function of the fluid density condition therein, a signal sampling and density condition computing circuit operating in dependency upon the receipt of the continuous digital output signal for intermittently sampling said digital output signal and computing the average density condition during the signal sampling period, and an electronic multiplication circuit operating in dependency upon the continuous receipt of the rate meter output signal; said signal sampling and density condition computing circuit including storage means having an output control signal during the interval between successive computations which represents the average density condition during the signal sampling period preceding the interval, said electronic multiplication circuit being responsive and connected to receive said output control signal and having an output signal during the interval between successive computations which represents the product of the average density condition represented by the control signal and the volume flow rate condition represented by the rate meter output signal received during the interval.

7. The method of continuously computing mass flow rate related information from continuous signals that include a signal representing the monitored volume flow rate condition of a fluid flowing through a conduit and a digital signal having a frequency that varies as an inverse substantially linear function of the monitored density condition of the flowing fluid comprising intermittently sampling the digital signal for a predetermined number of cycles in the signal sample, counting the pulses in a high frequency clock signal during each sampling period in counting means registering, at the end of the sampling period, the difference between the pulse count and a predetermined count, successively transferring the registered difference counts to electronic memory means having an output control signal which, during the interval between successive transfers, represents the average fluid density condition during the sampling period associated with the registered count last memorized therein, continuously delivering the signal representing the fluid flow rate condition to electronic multiplication means, and continuously controlling the electronic multiplication means in response to said output control signal to provide an output signal which, during the interval between successive transfers, represents the product of the average density condition represented by the output control signal during the interval and the fluid flow rate condition represented by the fluid flow rate condition signal delivered during the interval to the electronic multiplication means.

\* \* \* \* \*